US008973233B2

(12) United States Patent
Jones

(10) Patent No.: US 8,973,233 B2
(45) Date of Patent: Mar. 10, 2015

(54) PROPELLANT ACTUATED HINGE REMOVER

(76) Inventor: Ronald G. Jones, Alton, IL (US)

( * ) Notice: Subject to any disclaimer, the term of this patent is extended or adjusted under 35 U.S.C. 154(b) by 881 days.

(21) Appl. No.: 13/174,133

(22) Filed: Jun. 30, 2011

(65) Prior Publication Data

US 2012/0000047 A1 Jan. 5, 2012

Related U.S. Application Data

(60) Provisional application No. 61/360,628, filed on Jul. 1, 2010.

(51) Int. Cl.

| | |
|---|---|
| ***B23P 19/04*** | (2006.01) |
| ***F42B 3/00*** | (2006.01) |
| ***F41H 5/22*** | (2006.01) |
| *E05D 7/12* | (2006.01) |
| *E05D 11/00* | (2006.01) |

(52) U.S. Cl.

CPC ................ *F42B 3/006* (2013.01); *F41H 5/226* (2013.01); *E05D 7/121* (2013.01); *E05D 11/00* (2013.01); *E05Y 2900/504* (2013.01); *E05Y 2900/531* (2013.01); *E05Y 2800/252* (2013.01); *E05Y 2800/67* (2013.01)

USPC ........................................................... 29/254

(58) Field of Classification Search

USPC ................ 269/287, 3, 6, 95, 71; 29/254, 252, 29/283.5

See application file for complete search history.

(56) References Cited

U.S. PATENT DOCUMENTS

| | | | | |
|---|---|---|---|---|
| 5,196,647 | A * | 3/1993 | Majors | 102/303 |
| 6,318,228 | B1 * | 11/2001 | Thompson | 89/1.14 |
| 2005/0240331 | A1 * | 10/2005 | Nowak et al. | 701/49 |
| 2011/0131986 | A1 * | 6/2011 | Andres et al. | 60/632 |

* cited by examiner

*Primary Examiner* — Lee D Wilson
*Assistant Examiner* — Nirvana Deonauth
(74) *Attorney, Agent, or Firm* — Charles McCloskey

(57) ABSTRACT

A hinge remover has a thick cylindrical base with a central opening and a flange, a hollow cylindrical wall upon a yoke, and two spaced apart shoulders upon the yoke. The shoulders receive a door pin. The wall receives a head upon a spring and has two diametrically opposed recesses for ball bearings. The central opening admits the head extending opposite the yoke. The central opening narrows and forms a chamber for a propellant. The base has a radial aperture that opens for an igniter that contacts the propellant. During assembly, the head compresses upon the spring against the yoke revealing the recesses to receive the ball bearings as the head eases inwardly. Upon combustion of the propellant, the head retreats towards the yoke, the ball bearings fall, and the yoke separates from the base.

9 Claims, 2 Drawing Sheets

PROPELLANT ACTUATED HINGE REMOVER

CROSS-REFERENCE TO RELATED APPLICATION

This non-provisional application claims priority to the pending provisional application 61/360,628 filed on Jul. 1, 2010 which is owned by the same inventor.

BACKGROUND OF THE INVENTION

The propellant actuated hinge remover generally relates to vehicle and strong door hinges and more specifically to a hinge plate, or yoke, having a specialized form and components that release the yoke following ignition of a propellant. The present invention remains inert until a command ignites the propellant which then releases the mechanical hold of the yoke to a vehicle or a door frame. The present invention allows for rapid egress from a vehicle or room, typically in an emergency.

Vehicles and rooms with heavy doors, such as coolers, freezers, and light vaults, have doors mounted upon hinges attached to a frame or as an integral part of a frame. The following description refers to vehicles though application to heavy doors not on vehicles is included. A vehicle generally has doors for ingress and egress of passengers and for loading and unloading cargo into the interior of the vehicle. Vehicle doors generally pivot on an exterior edge upon hinges inside of the exterior surface of a vehicle. This location prevents the hinges from disrupting the appearance of the vehicle and from reducing the airflow along the vehicle. In military vehicles, locating hinges within the body of the vehicle also lessens the radar profile of the vehicle.

A vehicle door hinge generally has two components connected by a pin or other rotatable means, such as a pawl and wheel. One component secures to an edge of the door and the other component secures to the vehicle body. A pin, or other rotatable means, then allows the component on the door to pivot relative to the component upon the vehicle body. Upon select vehicles, the component upon the body remains an integral part of the body. The body itself has various pins formed therein that cooperate with the component upon the door during opening and closing.

Vehicles in general include armored military land vehicles, bomb disposal vehicles, and select naval equipment. These vehicles generally have heavy doors because of their armor yet the doors serve the same passenger and cargo purposes as other vehicle doors. These doors protect the people and cargo inside an armored vehicle from weapons fire, concussion, explosion, nuclear, biological, chemical agents, and the weather. To fulfill this protective purpose, the doors have armor much like the remainder of the vehicle and various seals to close the perimeter of the door to infiltration by a host of hazards in a combat, bomb disposal, or other serious situation. From time to time though, such a door on an armored vehicle requires quick opening, typically for emergency egress of the vehicle passengers and crew. A quick door opening may take place following a round entering the compartment of the vehicle occupied by people or the armored vehicle losing the ability to move.

DESCRIPTION OF THE PRIOR ART

Over the years, armored vehicles and select ships have had various doors and related hinges. The door assembly initially followed that of residential construction, passenger vehicles, and later commercial vehicles. Early armored vehicles had hinges with two leaves joined by a pin through the common edges of the leaves. The leaves then joined the door and the vehicle frame leaving the pin within the rings outwardly from the vehicle. In an emergency, a crewmember pulled the pins and released the door for a quick exit of the crew from the vehicle.

Then the pins evolved to have rounded ends that prevented their inadvertent removal from a host of hazards in a combat, bomb disposal, or other serious situation. Rounded end pins though presented a limited edge for extracting them from a hinge. Select hinges had a rounded end pin incorporated into a leaf so that lifting a door upwardly lifted the pin from the other leaf, usually attached to the vehicle, thus removing the door from the vehicle. Lifting an armored door off its hinges has proven a challenge to a crew seeking an emergency exit.

As armor increased in weight and thickness upon vehicles, hinges with leaves of a narrow width lacked the capacity to support heavier doors. The door hinges became wider and extended farther out from the vehicle opening. The door hinges took on the appearance of straps. The strap like door hinges often attached to the exterior of a vehicle with both leaves and the pin exposed to a host of hazards. Armor then increased its weight further and also acquired reactive capability, that is, self detonating, to repel warheads or other hazards touching a vehicle. The weight and reactive capability of armor and radar avoidance limited further usage of strap like hinges exposed upon the surface of an armored vehicle. Door hinges then incorporated the pin and one leaf into the frame of the armored vehicle and the other leaf of the hinge into the perimeter of the door. The door hinges then occupied a recessed position within the armor of the armored vehicle which presented a smooth surface in the vicinity of the door. The door and its hinges blend into the armor and overall profile of the vehicle lessening its radar profile. The recessed hinges though prevent ready access to removing pins or hinges for a quick opening of the door.

Exploding pins in a hinge provide another means to separate the leaves of a hinge for ready removal of a door. The pins, generally hollow, have an explosive charge placed through their length and a detonation means. In an emergency, detonation of the explosive shatters the pin so that the hinge leaf upon the door separates from the leaf upon the vehicle frame. However, usage of the door, opening and closing, wears on the pin and causes premature detonation from time to time. Shattering the pin also prevents reuse of the pin and may damage one or both hinge leaves which leads to scrapping of an entire door. Further, explosives utilized in a hinge remain similar to a bomb ready for detonation thus, requiring some shielding for vehicle occupants. Explosive bolts in fracturing may also swell and stick in place preventing the emergency egress sought. The high impulse shock, with its short duration of 30-50 nanoseconds, succumbs to the inertia of door holding fixtures.

Though the description has involved a door on an armored vehicle, this description and the remainder of the specification also apply to doors upon ships, freezers, coolers, strong rooms, bunkers, garages, hangars, and other locations where people, cargo, or equipment, inside an enclosed space require a ready, rapid, exit through a closed door.

The present invention overcomes the disadvantages of the prior art and provides a propellant actuated hinge remover that keeps a leaf of a hinge secured to a frame during most situations, releases the leaf upon ignition of a propellant such as during an emergency, and allows for reuse of a door. This hinge remover holds a hinge mechanically to a door frame yet uses a propellant actuated mechanism to release the mechanical hold thus separating a leaf of a hinge from the frame, allowing for removal of the door quickly. This hinge remover bolts into an opening of an existing door frame and allows for command ignition either manually or automatically.

SUMMARY OF THE INVENTION

Generally, the propellant actuated hinge remover has a thick base, generally cylindrical with a central opening and a flange, a hollow cylindrical wall upon a yoke, and two spaced apart shoulders upon the yoke. The shoulders receive a pin to hold a door. The wall receives a spring and a head upon the spring. The wall also has two diametrically opposed recesses that receive ball bearings of suitable diameter for the recesses. The central opening of the base admits the piston with the head upon the spring extending opposite the yoke. Opposite the flange, the central opening narrows in diameter and forms a chamber that accepts a propellant. Opposite the flange and the chamber, the central opening narrows a second time to form a fill hole for loading of propellant into the chamber. A cap closes the fill hole further, the fill hole also allows insertion of a rod that compresses the spring during assembly and disassembly of the invention where the ball bearing drop within the piston as the hinge assembly slides into or out of the body. Extending radially from the chamber, the base has a slot that opens upon the exterior of the base inwardly from the flange. The slot accepts an igniter that maintains contact with the propellant. During assembly of the invention, the head is compressed upon the spring against the yoke outwardly revealing the recesses in the cylindrical wall. Then the ball bearings are placed into the recesses and the head is eased inwardly securing the ball bearings into the recess and the head within the base. The present invention installs upon the Stealth Reconnaisance Assault Transport System—SRATS—though the Applicant foresees installations on other vehicles and facilities.

There has thus been outlined, rather broadly, the more important features of the invention in order that the detailed description thereof that follows may be better understood and that the present contribution to the art may be better appreciated. The present invention also includes an O-ring, propellant, and a chamber with stepped inward diameters. The propellant may include diluted RDX. Full strength RDX is a high explosive that serves as a boosting ingredient in select solid propellants. RDX does create an explosive force but without enough sustained gas pressure to move the piston through a stroke that would remove it from the housing. RDX though causes a shockwave that travels at 8000 meters per second damaging the hinge assembly at rest before the assembly moves at all. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a hinge remover that separates its two major components rapidly.

Another object is to provide such a hinge remover that remains dormant during typical road and off-road travel.

Another object is to provide such a hinge remover that utilizes an energetic propellant actuated device rather than a pure explosive.

Another object is to provide such a hinge remover that remains safe from projectile impact.

Another object is to provide such a hinge remover that utilizes a propellant safe from a 0.30 caliber projectile.

Another object is to provide such a hinge remover that fires readily upon battery power of a vehicle or other installation.

Another object is to provide such a hinge remover that functions in the range of 0.018 to 0.050 seconds.

Another object is to provide such a hinge remover that has a low cost of manufacturing so the purchasing units and organizations can readily buy the hinge remover through existing supply channels.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
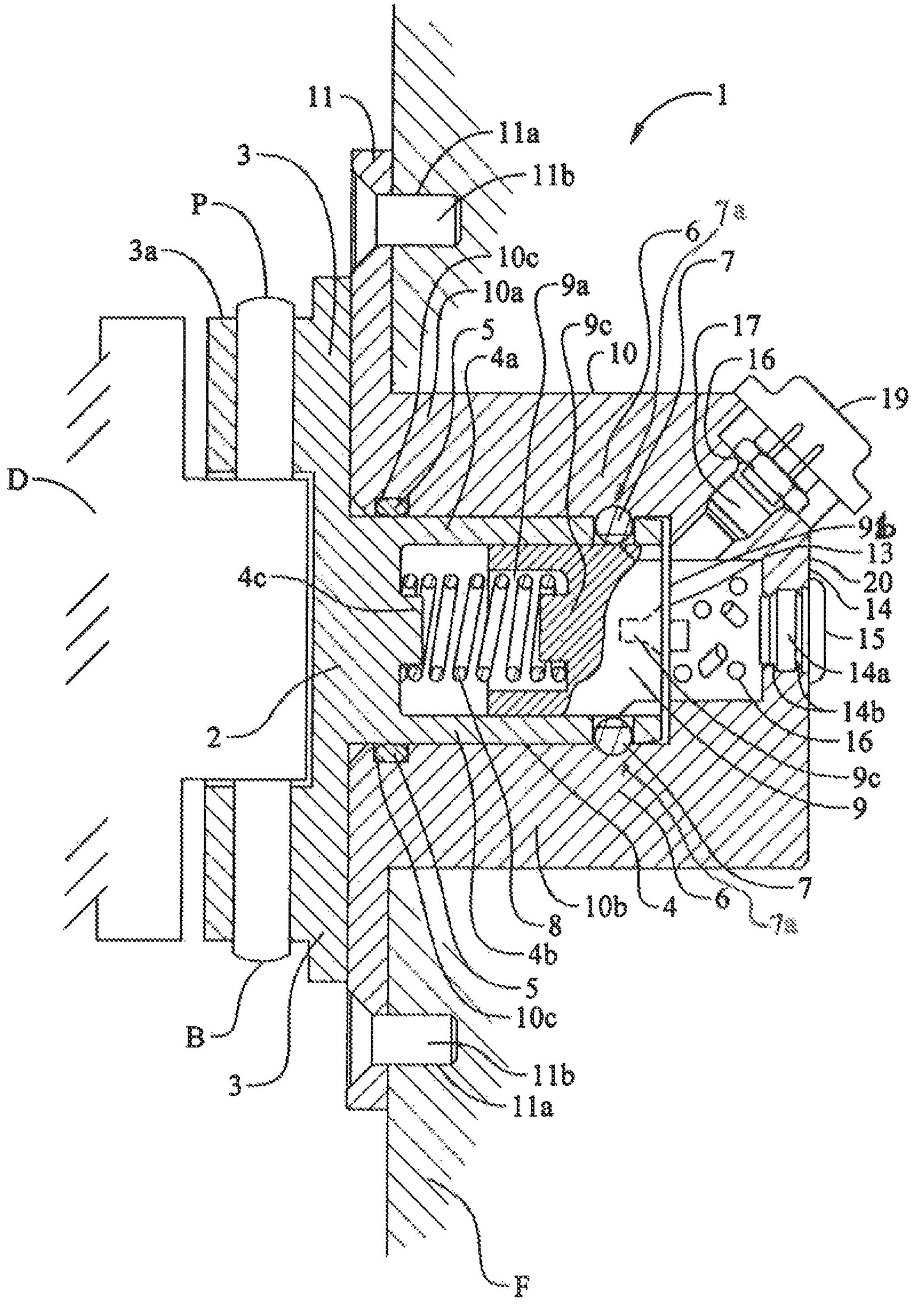
FIG. 1 shows a side sectional view of the invention installed in a door frame; and, FIG. 2 describes an exploded view of the invention.

The present art overcomes the prior art limitations by providing a propellant actuated hinge remover that separates a hinge from a frame typically of a vehicle for land or sea, and upon select building doors. FIG. 1 shows the propellant actuated hinge remover 1 installed upon a frame F. Preferably, the invention installs upon a vehicle frame such as a tank, other armored vehicle, or MRAP. Alternatively the invention installs upon a frame to a room or compartment such as a bunker, vault, ship passageway, or strong room. This description continues with reference to a vehicle frame while incorporating usage of the invention upon a frame to a room. The remover 1 connects to a door D, here shown partially, with at least one pin P secured within the remover 1 upon which the door D pivots.

Proximate the door, the remover 1 has a yoke 2 with a generally elongated shape, here shown as rectangular. The yoke has a length similar to the portion of the door D, such as a leaf, that pivots within the remover. Generally symmetric, the yoke has two spaced apart shoulders 3. Each shoulder has a width and a thickness outwardly from the yoke towards the door. The width and the thickness exceed the diameter of the pin P inserted into the shoulders. The width and the thickness of the shoulder resist the torsion, bending moment, and shear forces imposed by the door to the remover 1. The pins occupy a hole 3*a* in each shoulder where the hole has a length generally parallel to the surface of the frame. The shoulders are generally spaced apart for turning of a portion of the door.

Opposite the shoulders, the yoke has a wall 4, later shown as cylindrical in shape, here shown as two parallel segments, 4*a*, 4*b*. The wall extends away from the yoke more than the thickness of the shoulder, generally at least twice the shoulder thickness. The wall is generally hollow as shown by the spaced apart segments, each segment having a thickness slightly less than the yoke thickness. Proximate the yoke, the remover includes an O-ring 5 that seals the wall 4 of the yoke to the remainder of the invention. The wall has a rounded groove 6, here shown as two recesses, well away from the shoulders, generally proximate the end of the wall, inwardly to the frame. The recesses, of the groove, are mutually spaced apart and each recess has a generally round shape that receives a ball bearing 7. When placed in the recess, the ball bearings secure the wall within the remainder of the remover, the ball bearings and groove operate as a mechanical hold as at 7*a*. Preferably, the remover has four ball bearings 7 generally equally spaced about the wall. The ball bearings seat within swaged holes by a drill point in the wall.

Within the wall 4, the yoke has a stub 4*c* generally centered inside of the segments and proximate the yoke. The stub receives a biasing member, or spring 8, that expands outwardly from the yoke generally parallel to the segments of the wall. Opposite the stub, the spring fits within a head 9. The head has a hollow end 9*a* that receives the spring upon its own stub 9*c*. Opposite its hollow end, the head has a solid face 9*b* that abuts the remainder of the invention. The solid face though has a centered frusto conical chamber 9*c* extending axially inward. This chamber channels the pressurized gasses of the combusting propellant for even application of force upon the head. The solid face has a material of sufficient thickness and hardness to resist an explosion and gas pressures of approximately 52,000 psi.

Inwardly towards the frame from the yoke 2 and its wall 4, the remover 1 has its base 10 that has at least one flange, here showing two flanges 11. The flanges generally extend farther from the shoulders 3 of the yoke. As later shown, the flanges form a rectangular shape for securement to a frame. Each flange has its tapped hole 11*a* that admits a screw 11*b* in the frame F. The screws provide mechanical securement of the remover 1 to the frame during its operational lifetime. The screws also allow for removal of the base after an ignition of the propellant as later described. The base has a hollow interior formed from a central opening 12. The central opening extends inward from the flanges 11 towards the interior of the vehicle, that is, inwardly from the door. Similar to the wall 4, the base 10 has two portions, 10*a*, 10*b*, mutually parallel and spaced apart as shown. The portions have much greater thickness than the flanges and the yoke, approximately four times the flange thickness. The portions establish that the central opening has sufficient width and length to admit the wall 4. Slightly inward from the flanges, the central opening has a slot 10*c* that admits the O-ring 5 as previously described. Much inwardly from the slot 10*c*, the portions 10*a*, 10*b*, have their section of the recess 6 from the wall. Their sections are generally rounded and a have a depth a mere fraction of the radius of the ball bearings 7. The sections primarily receive the ball bearings so that the ball bearings fit tightly between the wall and the sections without compression of the ball bearings.

Inwardly from the ball bearings 7 and proximate the head 9, the central opening steps inwardly in width to less than the width of the head. This stepped inward portion of the central opening is the chamber 13. The chamber is also hollow and has a length of approximately 16% of the length of the base. Away from the head, the chamber opens to a fill hole 14 that extends furthest into the frame from the flange. The fill hole opens through a breech 20 of the base. The breech is generally opposite the flange and extends across the portions 10*a*, 10*b* of the base. The fill hole 14 receives a cap 15 to contain the contents within the fill hole. The fill hole has threading 14*a* that mates with threading upon the cap. The material of the cap has sufficient strength to resist the explosive pressures generated within the chamber. When the remover has been prepared for installation, the chamber contains a propellant 16 that combusts very rapidly, in the range of approximately 0.018 seconds through approximately 0.050 seconds. This range of times provides a device with negligible effects upon occupants of vehicle but slightly more time than with explosives. The propellant has a formulation that produces sufficient gas pressure to function the invention at its time of need, emergency egress of people. Typical solid or composite propellants contain a fuel component and an oxidizing component. Ignition of the fuel produces a very rapid thermo-chemical reaction producing heat and gases at high temperature. The fuel includes organics such as nitrocellulose or charcoal, vinyl, or explosives such as gun cotton, HNS, RDX, or PETN. includes and high energy composites such as RDX. Inorganic fuels include powdered metals such as iron, zinc, boron, magnesium, and others. Suitable oxidizers include ammonium perchlorate, potassium perchlorate, or nitrates of boron, barium or other elements, or oxides of iron, lead, or other elements. Regarding RDX particularly, RDX serves as a high explosive and see use only as an additive to more conventional propellants to boost their output energy. RDX therefore undergoes consumption as a fuel additive. Alone, RDX is a secondary explosive that requires a primary explosive, such as like lead azide or lead styphnate, to accumulate the explosive propagation velocity until the RDX achieves initiation energy to explode as a high explosive. RDX alone generally does not see use for generating pressure due to its risk of ancillary damage and shock. The present invention utilizes various formulations of propellants that begin with a fuel/oxidizer combination. The propellant of the invention seeks to create the pressure time relationship to compress the locking piston, unlatch the mechanism, and provide the heat and gas pressure to drive the hinge attachment free of the body of the invention. The propellant may have a pelletized form that allows for unlocking of small grains, overcoming of inertia in the invention and related door, and for larger grains that sustain the chamber pressure as the volume increases with the stroke.

The present invention foresees using between 0.01 pounds to 5 pounds of propellant. In the invention, the propellant has sufficient weight to eject the yoke from the wall without leaving any residual amount of unburnt propellant. During ejecting of the yoke, the yoke bears a portion of the weight of an attached door. Such doors may have various weights ranging from a light armored vehicle door to a heavy armored door upon a fixed bunker of classified storage room. Heavier doors call for additional weight of propellant or propellants with greater foot*pound per pound ratios.

Off to one side, the chamber has an elongated aperture 17 that extends radially from the center of the chamber through one portion of the base, here shown as 10*a*. The aperture receives an igniter 18 that contacts the propellant or a blasting cap if needed and extends outwardly from the aperture proximate the surface of the base. The igniter may have two prongs suitable for connection to electrical wiring or other control mechanism. Preferably, the igniter fires from battery power, typically off of a vehicle. Battery power provides nearly constant power in contrast to capacitor discharge that once used takes a long time to recharge. Capacitor discharge does not allow for a second use upon a failure of the igniter the first time. Alternatively, the igniter has a safety 19 that covers it outwardly from the base.

Figure 2:
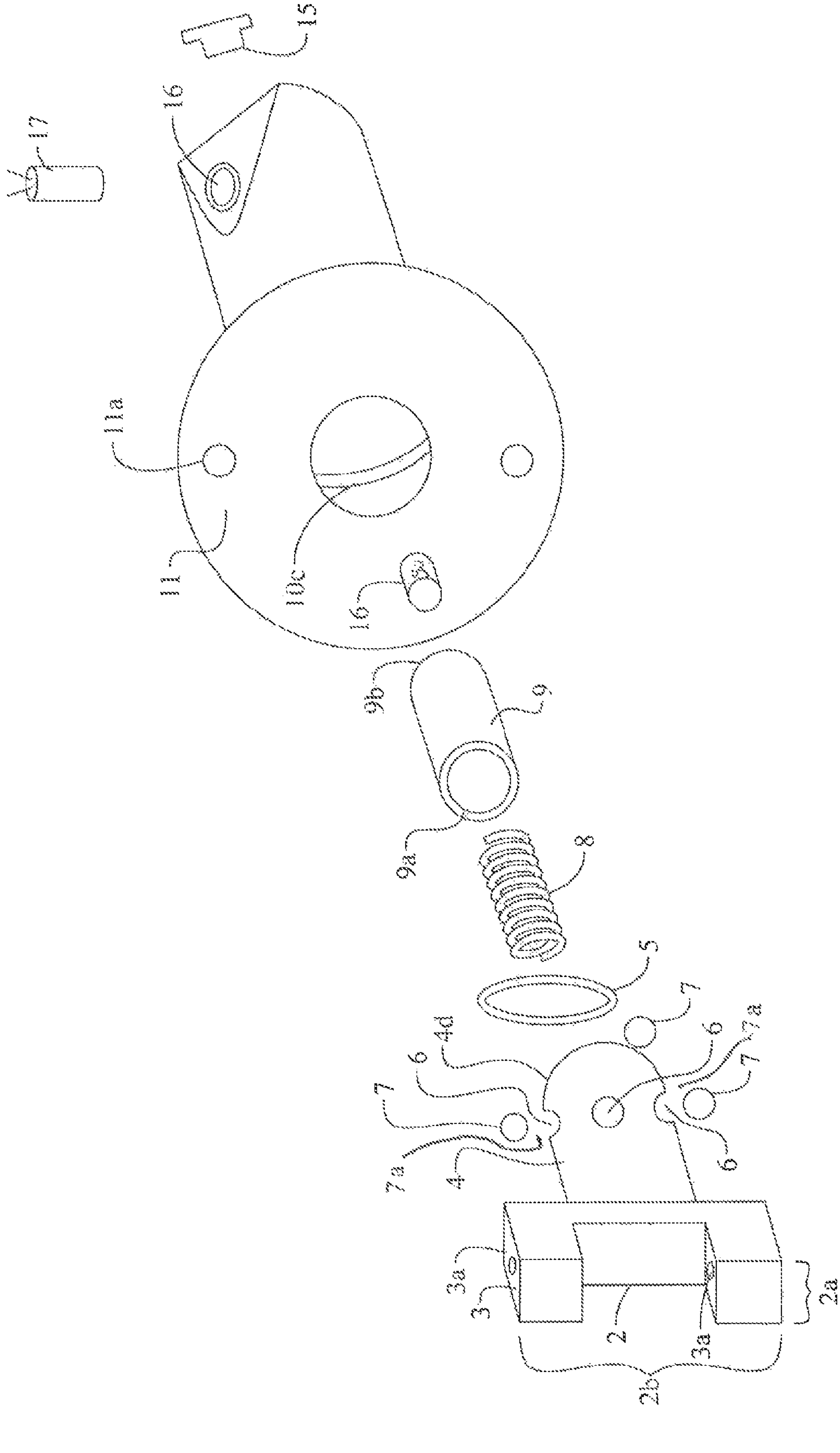

Moving to FIG. 2, the remover is shown in an exploded view. The remover 1 begins with the yoke 2 shown as rectangular with a narrow lateral axis 2*a* and an elongated longitudinal axis 2*b*. The longitudinal axis orients the yoke generally upright, that is, perpendicular to the surface upon which a vehicle travels. Spaced apart and outwardly, the yoke has two shoulders 3. Each shoulder has a thickness exceeding that of the yoke and slight less length than the spacing between the two shoulders. Each shoulder then has a hole 3*a* extending through it generally parallel to the longitudinal axis 2*b*. The hole has a diameter sufficient to admit a pin P of a door in a generally snug fit. Centered upon the yoke and opposite the shoulders, the wall 4 has a generally cylindrical shape with a diameter slightly less than the spacing between the shoulders. As previously described, the wall extends away from the yoke a substantial distance, well more than the thickness of the yoke as shown. Opposite the yoke, the wall has its inner end 4*d* that enters the central opening 12 of the base 10 of the assembled remover 1. Slightly inward along the wall from the inner end, the wall has at least two recesses 6 that each receives a ball bearing 7. Each recess is round and each ball bearing is spherical. The diameter of the recess and the ball bearing are identical. The recesses extend through the wall segments 4*a*, 4*b* providing access to the hollow interior.

Slipped over and along the wall, the remover includes the O-ring 5 with an inner diameter slightly less than the outer diameter of the wall. The O-ring 5 fits within the slot 10*c* of the base. Then the inner end 4*d* of the wall accepts the spring 8. The spring has a length when unstressed that places the solid face 9*b* of the head flush with the inner end 4*d* of the assembled remover. The spring also has a spring constant, or k, that keeps the spring rigid during normal vehicle movement yet allows the spring to compress upon ignition of the propellant. The spring has sufficient diameter to avoid breakage during an explosion. The spring then fits within the head 9. More precisely, the spring enters the hollow end 9*a* and extends into the head until it abuts the stub 9*c*, not shown. The head is generally cylindrical and of a lesser diameter than the outer diameter of the wall and of an identical diameter to the inner diameter of the wall. Opposite the hollow end, the head has its inner face 9*b*.

As shown outwardly from the inner face 9*b*, the remover 1 has the propellant 16. Though shown in cylindrical form, the propellant takes the shape of the chamber 13. As previously described, the propellant can be a powder or a solid capable of rapid burning. Outwardly from the propellant as shown, the base 10 collects the components of the invention for installation as a unit upon a door frame. The base is generally cylindrical with an opening 12 upon one end and the fill hole upon the opposite end, not shown. Proximate the opening, the base has a flange 11 here shown as rectangular and generally perpendicular to the length of the base. The flange has at least two holes 11*a* through it, mutually spaced apart, that receive screws, bolts, rivets, or other mechanical fasteners. The fasteners secure the remover 1 to the door frame and remain secured during and following ignition of the propellant. Though a rectangular flange is shown, round, square, or elliptically shaped flanges are foreseen. Inwardly from the flange 11, the opening 12 has the slot 10*c* that receives the O-ring 5 placed around the wall 4 inwardly from the yoke 2. The slot extends around the internal circumference of the central opening.

Nearly opposite the flange 11, the base has the aperture 17 slightly inward from the breech 20. The aperture extends radially outwards through one portion of the base, here shown as 10*a*, the upper portion. The aperture has an inner diameter forming a hollow cylindrical shape. The aperture extends from the chamber to the surface of the base. The aperture has a countersink at the surface for reception of a safety, not shown. The igniter 17 fits into the aperture and extends from the propellant to slightly outside of the surface of the base.

The breech 20 includes the fill hole, generally centered therein and the cap 15 closes the fill hole. The cap, the chamber, the inner face of the head, and the end of the igniter cooperate to retain the propellant in the base. The igniter in contact with the propellant provides the impulse of energy to start combustion of the propellant upon command.

Having described the components of the invention, the invention assembles by placing the O-ring 5 into the slot 10*c*. Then an end of the spring is placed upon the stub within wall and the head is placed upon the other end of the spring. The head is then pushed inward towards the yoke, allowing for insertion of the ball bearings 7 into the recesses of the groove 6. The ball bearings are less than fully inserted so that the ball bearings are flush with the exterior of the wall. Preferably, the recesses do not pass completely through the wall but stop short of doing so. The recesses each have a residual drill point remaining proximate the bottom or interior of the recess. The residual drill point prevents a ball bearing from passing completely through the end of the recess. Generally following placement of a ball in a recess, the wall has the residual drill point material staked over which disrupts enough material to prevent the ball from falling out of the recess. Therefore, with the locking piston and spring in place, the yoke can be moved to the central opening 12 and into the wall. During assembly, a worker compresses the spring utilizing a rod just enough so that the balls fit into the cooperating depressions of the locking piston. Where once the balls enter the chamber, a worker pushes them past the O ring for camming into the locking groove by the spring force applied against the locking piston. For disassembly of the invention, a worker inserts a rod through the fill hole and pushes the locking piston against the spring thus compressing the spring enough for camming the balls out of the groove thus unlocking the yoke from the wall for removal.

In an alternate embodiment, a band, tape, or adhesive temporarily holds the ball bearings inwardly and upon the inner face of the head. With the head and ball bearings assembled into the wall 4, the head, with the yoke following, is inserted into the central opening 12 within the O-ring. The insertion is generally quick to avoid the ball bearings extending fully into the O-ring. The wall is advanced fully into the central opening of the base so that the yoke abuts the flange and the ball bearings extend fully outwardly allowing the inner face of the head to abut the chamber. Propellant is then loaded through the fill hole as much as possible and the cap is emplaced in the fill hole. This loading does not fill the chamber so additional propellant is loaded through the aperture until the chamber fills completely. Then an igniter is installed in the aperture so that it makes contact with the propellant. A safety remains on the igniter to prevent premature ignition of the propellant and activation of the remover. The base is then placed in a prepared opening in the door frame and secured by screws through the holes in the flange. Then a door pin is emplaced through a hinge leaf to attach a door. With installation complete from a mechanical perspective, the safety is removed and the igniter connected to a command source, generally an electrical circuit, not shown.

Most of the time during usage, the remover remains dormant. However, when an emergency occurs, a person, or a select sensor, inside of the door frame issues a command to the igniter that sends a spark or concussion into the propellant. The propellant ignites and burns rapidly creating heated gases inside the chamber. The heated gases seek to expand outwardly from the chamber though thwarted in that effort by the cap 15 and the igniter 17. The heated gases though supply pressure against the inner face of the head. Upon complete combustion of the propellant, the heated gases press the head against the spring so that the spring compresses and the head moves towards the yoke. When the inner face of the head passes the inside edges of the recesses, the ball bearings fall out of the recesses within the wall. This allows the remaining gas pressure to eject the wall with the yoke outwardly from the base and the frame of the door. By ejecting the yoke, the remover separates the pin of the door hinge from the frame allowing for the door to detach from the frame quickly. With the door detached, people can exit from behind the door in a timely manner to avoid an emergency.

From the aforementioned description, a propellant actuated hinge remover has been described. The remover is uniquely capable of providing a hinged connection for a door to a frame that rapidly separates a yoke joined to a wall from a base using a propellant. The wall remains secured to the base using mechanical means until an emergency triggers combustion of the propellant to release the mechanical means, allowing for separation of the hinged connection. The hinge remover and its various components may be manufactured from many materials, including but not limited to, steel, cast iron, aluminum, polymers, high density polyethylene, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device that rapidly separates a hinge of a door from a frame, the hinge pivoting upon a pin, said device comprising:

a yoke adapted to connect to the door;

a base adapted to connect to the frame, said base receiving said yoke;

a propellant placed within said base inwardly of said yoke; and, an igniter in contact with said propellant;

wherein said igniter causes combustion of said propellant producing expansive forces upon said yoke rapidly ejecting said yoke from said base thus separating the hinge;

said yoke having an elongated shape, a thickness, a length, and two spaced apart shoulders, and a cylindrical wall opposite said shoulders;

said shoulders having a greater thickness than said yoke and collinear holes there through adapted to admit the pin of a door, said holes being generally parallel to the length of said yoke; and, said cylindrical wall being hollow, round with a diameter, having a length generally perpendicular to said yoke, and receiving means to connect said yoke to said base.

2. The door hinge separating device of claim 1 further comprising:

said wall having means to connect said yoke to said base, said connecting means having a biasing member locating within said wall generally parallel to the length of said wall, a head upon said biasing member outwardly from said yoke, said head being flush with said wall opposite said yoke when said biasing member is at rest, and a mechanical hold wherein passage of said head inwardly beyond said mechanical hold releases said mechanical hold and said wall from said base.

3. The door hinge separating device of claim 2 further comprising:

said wall having at least two apertures there through opposite said yoke, at least two ball bearings, each of said ball bearings locating in one of said apertures and engaging said base wherein said head urges said ball bearings outwardly thus preventing premature removal of said wall from said base.

4. The door hinge separating device of claim 1 further comprising:

said base having a length, a central opening extending for said length, said central opening receiving said yoke, at least one flange extending outwardly from said central opening, said at least one flange adapted to secure said base to the frame;

said central opening having a slot inwardly from said flange, an O-ring locating in said slot, said O-ring having an inner diameter similar to the diameter of said wall; and, said central opening having a first diameter similar to the diameter of said wall wherein said central opening admits said wall into said base, a second diameter less than said first diameter, said second diameter forming a chamber generally hollow and round, and a third diameter less than said second diameter, said third diameter forming a fill hole opening outwardly through said base opposite said flange, an aperture extending radially from said chamber.

5. The door hinge separating device of claim 4 further comprising:

said propellant being placed into said chamber;

a cap being placed into said fill hole; and, said igniter locating in said aperture wherein activation of said igniter initiates combustion of said propellant causing pressure against said head, moving said head against said spring towards said yoke thus separating said yoke from said base and separating said door hinge.

6. The door hinge separating device of claim 5 wherein said propellant burns within the range of approximately 0.018 seconds to approximately 0.050 seconds.

7. The door hinge separating device of claim 5 wherein said propellant has a pelletized form including small grains and large grains.

8. A device that rapidly separates a hinge of a door from a frame, the hinge pivoting upon a pin, said device comprising:

a yoke adapted to connect to the door, having an elongated rectangular shape, a thickness, a length, two spaced apart shoulders, and a cylindrical wall opposite said shoulders;

said shoulders having a greater thickness than said yoke and collinear holes there through adapted to admit the pin of a door, said holes being generally parallel to the length of said yoke, said cylindrical wall being hollow, round with a diameter, having a length generally perpendicular to said yoke, said wall having at least two apertures there through opposite said yoke, at least two ball bearings, each of said ball bearings locating in one of said apertures and engaging said base wherein said head urges said ball bearings outwardly;

a base adapted to connect to the frame, said base receiving said yoke;

said wall having means to connect said yoke to said base, said connecting means having a biasing member locating within said wall generally parallel to the length of said wall, a head upon said biasing member outwardly from said yoke, said head being flush with said wall opposite said yoke when said biasing member is at rest, and a mechanical hold wherein passage of said head inwardly beyond said mechanical hold releases said mechanical hold and said wall from said base;

said base having a length, a central opening extending for said length, said central opening receiving said wall of said yoke, at least one flange extending outwardly from said central opening, said at least one flange adapted to secure said base to the frame, said central opening having a slot inwardly from said flange, an O-ring locating in said slot, said O-ring having an inner diameter similar to the diameter of said wall;

said central opening having a first diameter similar to the diameter of said wall, a second diameter less than said first diameter forming a chamber generally hollow and round, and a third diameter less than said second diameter forming a fill hole opening exteriorly through said base opposite said flange, and an aperture extending radially from said chamber;

a propellant placed within said chamber inwardly of said yoke and a cap being placed into said fill hole after placement of said propellant therein; and, an igniter locating in said aperture and contacting said propellant, wherein activation of said igniter initiates combustion of said propellant causing pressure against said head wherein said head moves towards said yoke, said yoke separates from said base, thus separating said door hinge.

9. The door hinge separating device of claim 8 wherein said propellant burns within the range of approximately 0.018 seconds to approximately 0.050 seconds and wherein said propellant has a pelletized form including small grains and large grains.

* * * * *